April 23, 1957   L. N. WILLIAMS   2,789,464
MIRROR
Filed Sept. 26, 1952
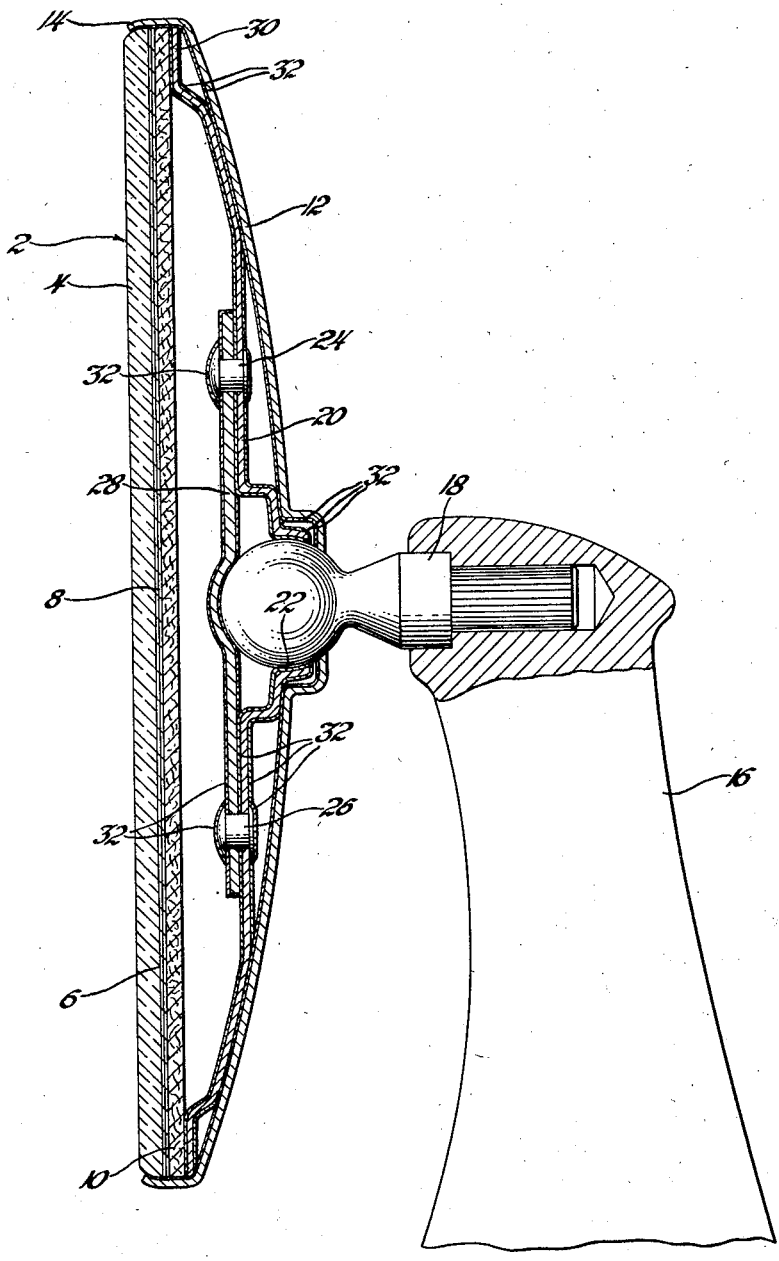
Inventor
Lyle N. Williams
By Willis, Helwig & Baillio
Attorneys United States Patent Office 2,789,464
Patented Apr. 23, 1957

2,789,464
MIRROR

Lyle N. Williams, Anderson, Ind., assignor to General Motors Corporation, Detroit, Mich., a corporation of Delaware Application September 26, 1952, Serial No. 311,729

1 Claim. (Cl. 88—98)

This invention relates to mirrors and more particularly to mirrors of the type used on automotive vehicles in locations where they are unprotected from the weather such, for example, as automobile outside rear view mirrors.

The conventional outside rear view mirrors which are in common use consist of a plate glass body, one side of which has a silver or other reflective metal or a lead sulphide coating protected by a second coating of some suitable inert material, this structure being supported in a casing which is carried by a support attached to the exterior of the vehicle. Generally, the exterior of the casing is chromium plated to present an attractive appearance and the interior surfaces of the casing as well as that of the other metal parts contained therein are provided with a coating of a corrosive-resistant metal or some other inorganic finish to prevent rust, etc. One common finish, for example, which is used on the interior metal surfaces of the mirror casing and support structure is dichromated zinc. Also, a cadmium plating is sometimes used to prevent interior corrosion.

It has been found that outside rear view mirrors of this type of construction are subject to failure due to the corrosion or loosening of the reflective coating on the glass body. Such failures generally begin adjacent the edges of the mirror and first manifest themselves by a greying or dulling of the reflective coating. Gradually, the metal or lead sulfide reflector surface dulls and loosens from the glass and blisters develop. This corrosion then works its way toward the center of the mirror. It has also been found that this type of mirror failure occurs more readily in the colder climates and during the winter months, particularly in those areas where there is heavy snowfall and where salts such as calcium chloride or sodium chloride are used to clear the roads of ice and snow.

It is an object of this invention to provide an encased mirror suitable for use on the exterior of motor vehicles and for similar uses which has increased resistance to mirror corrosion and which is economical to manufacture. Another object is the provision of a method for preventing the corrosion of the silver, lead sulfide or other reflective surface of mirrors of the type supported by a metal casing and commonly used on the exterior of automotive vehicles.

These objects are fulfilled in accordance with my invention by providing a mirror having a reflective surface adhered to a glass body, with a metal casing and supporting structure, the interior metal surfaces of which are provided with a coating of an inert organic material such, for example, as a paint, lacquer, enamel or varnish.

In the drawing I have shown a cross-sectional view of an automobile outside rear view mirror embodying my invention.

Referring to the drawing, 2 represents a mirror consisting of a plate glass body 4 which may be of any desired shape and size and which is provided with a silver or other suitable metal reflective surface 6 on the rear side thereof. Following the general practice, the reflective surface 6 may be protected by a coating of some suitable inert material 8 such as paint. In the embodiment shown, the mirror is also provided with a cloth felt material backing 10 which abuts the protective coating 8 or to the metal reflective coating 6 if no protective layer is used.

The mirror 2 is supported within a metal casing 12 by means of a flange 14 which is formed on the periphery of the casing and which engages the edge portions of the mirror and holds it in place. A suitable arm 16 for attachment to the vehicle has secured thereto a ball joint stud 18, the spherical end of which extends into an opening in the casing. In the interior of the casing, a metal stiffener plate 20 formed with a spherically shaped opening 22 has secured thereto by the rivets 24 and 26 a spring metal blade member 28 to form a socket for reception of the spherical end of the ball stud 18 thereby providing for universal movement of the casing and mirror. The edge portions 30 of the stiffener plate 20 resiliently engage the back of the felt backing 10 thereby retaining the mirror securely in position in the casing opening.

It will be understood that the mirror casing and supporting structure shown and described is given merely for purposes of illustration and that other structures could equally well be used within the spirit and scope of the invention.

I have discovered from tests conducted, that if the mirror alone, without the enclosing metal casing structure, is subjected to the conditions recited above, namely, ice and snow together with salt water, no failures of the type described occur. However, it is, of course, necessary to provide the mirror with some suitable casing and supporting structure and the most durable, economical and practical material for the casing and supporting structure is a metal such as steel, zinc, brass, etc. However, when the mirror is provided with a metal casing and supporting structure such, for example, as that thus far described in conjunction with the drawing, the failures of the type heretofore recited occur.

In accordance with my invention, such mirror failure can be greatly inhibited by the provision of a coating of an inert organic material on the surfaces of the metal parts inside the mirror casing. With reference to the drawing, I have shown the interior surface of the metal casing 12, the stiffener plate 20, the spring blade 28 and the rivets 24 and 26 as provided with a coating 32 of an inert organic material. It is especially important to provide the organic coating on those metal parts which abut or are positioned immediately adjacent the mirror. Thus, while it is preferable to coat all of the interior metal surfaces, it is particularly important to the practice of the invention to provide the stiffener plate 20 with the coating. The spherical end of the ball stud 18 which is chromium plated as is the conventional practice has been found to have no significant detrimental effect on the corrosion resistance of the mirror and is therefore not provided, in the embodiment shown, with an organic coating.

By the term inert organic material as used herein, I refer to those organic coatings which are substantially inert to water, salt and other substances generally encountered in the roads under all weather conditions and which are conventionally used as protective coatings for metals to prevent rust, etc. Thus, paint, enamel, varnish or lacquer may be used as the organic coating. It may, of course, be applied in any suitable manner such, for example, as by dipping, brushing or spraying. We have used metal parts dip-coated with prime enamel with much success.

As previously stated, heretofore, the interior metal parts of the mirror casing have usually been given a surface treatment with some inorganic material to prevent metal corrosion. Such metal treatments need not, of course, be used when the organic coating of this invention is applied since this organic coating serves to prevent rust and other metal corrosion. Thus, the inert organic coating serves two distinct functions: (1) it prevents mirror corrosion, and (2) it prevents metal corrosion.

The exact theory of the invention is not known and precisely why the provision of an organic coating on the interior metal parts of the mirror casing will prevent corrosion and failure of the mirror reflective surface is not fully understood.

One proposed theory is that, without such an organic coating, a battery action results when the mirror is subjected to salt water, this battery action causing deterioration of the metal reflective surface perhaps by way of the production of a harmful acid.

Whatever may be the theory or explanation, repeated and extensive tests have shown that mirrors constructed in accordance with this invention have a much greater resistance to mirror corrosion than do prior types of mirrors. For example, two groups of silvered mirrors having metal casing and supporting structure were subjected to water spray and salt, these conditions simulating or exaggerating those encountered on the roads during the cold months. One group was provided with a dichromated zinc coating on the interior metal parts and the other group was treated in accordance with this invention by providing a coating of prime enamel over the surfaces of the interior enamel parts. After exposure to the saltwater conditions, the inorganic treated mirrors showed failure in about 124 hours, the failure manifesting itself as dulling, blistering and general corrosion of the reflective surface around the edges of the mirror. On the other hand, the mirrors treated in accordance with this invention showed no noticeable failure even after 370 hours. This same test was also used on mirrors having a lead sulfide reflective coating, one group of the mirrors having the interior metal parts coated with dichromated zinc and another group having these same parts coated with prime enamel. The mirrors treated with the inorganic material failed after about 250 hours, while the mirrors treated in accordance with this invention showed no noticeable failure even after 1100 hours. Similar tests showed that mirrors with interior metal parts uncoated or else coated with other inorganic substances such as cadmium failed in a relatively short time in comparison to those in which the metal parts were coated with enamel, varnish or other inert organic material in accordance with this invention.

It is to be understood that, although the invention has been described with specific reference to particular embodiments thereof, it is not to be so limited since changes and alterations therein may be made which are within the full intended scope of this invention as defined by the appended claim.

I claim:

An outside rear view mirror for an automotive vehicle comprising a glass body having a reflective coating on the rear surface and a coating of inert material over said reflective coating, a metal supporting structure including a casing enclosing the rear surface of said glass body, the edge portions of said metal supporting structure engaging said glass body and the remainder of said metal supporting structure being spaced therefrom, a pad of fibrous material positioned between said coating of inert material and said metal supporting structure, and a coating of inert organic material covering substantially all the surfaces of said metal supporting structure within said casing to thereby inhibit corrosion of said reflective coating.

References Cited in the file of this patent

UNITED STATES PATENTS

| | | |
|---|---|---|
| 765,873 | Berry | July 26, 1904 |
| 2,155,964 | Bowers | Apr. 25, 1939 |
| 2,179,476 | Andrus | Nov. 14, 1939 |
| 2,307,568 | Colbert | Jan. 5, 1943 |
| 2,550,682 | Falkenburg et al. | May 1, 1951 |
| 2,585,399 | Mead | Feb. 12, 1952 |

FOREIGN PATENTS

| | | |
|---|---|---|
| 45,483 | France | May 27, 1935 |
| | (Addition to 780,479) | |